Oct. 19, 1965 L. E. MADANSKY 3,212,387
PLASTIC CAPTIVE SCREW WASHER
Filed May 8, 1962
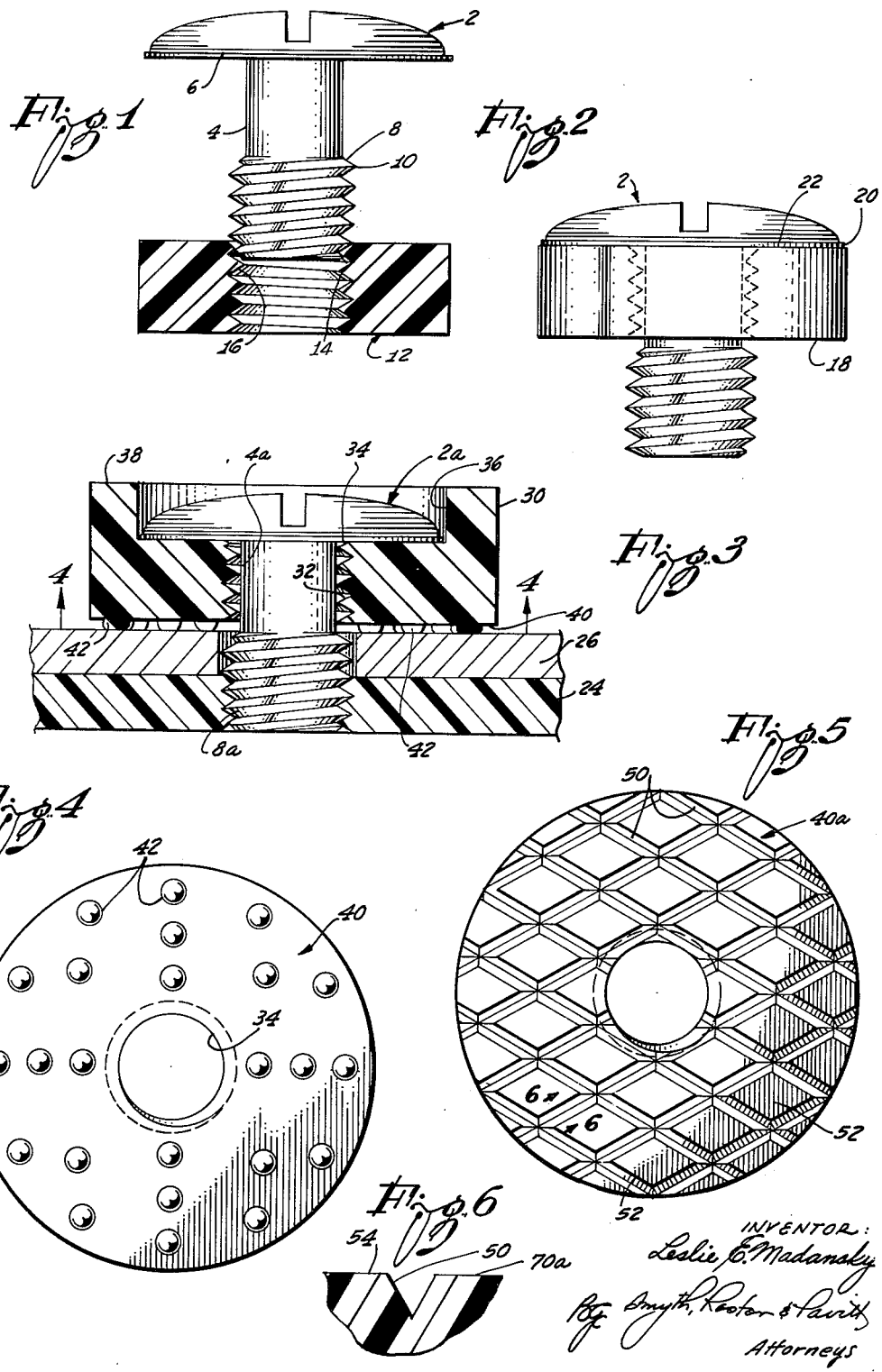

United States Patent Office 3,212,387
Patented Oct. 19, 1965

3,212,387
PLASTIC CAPTIVE SCREW WASHER
Leslie E. Madansky, Burbank, Calif., assignor to California Plasteck, Inc., Reseda, Calif., a corporation of California
Filed May 8, 1962, Ser. No. 193,123
8 Claims. (Cl. 85—1)

The invention relates to a screw and washer assembly and particularly to a fastening screw and washer assembly having utility in the mounting of translucent or transparent panel assemblies on an appropriate supporting structure utilized in aircraft or the like.

As a general rule, structures of the type here under consideration are applied to control panels of aircraft. Those skilled in the art will understand that the aircraft control panel contains thereon identified devices which must be observed by the pilot under aircraft operation and under a wide variety of ambient conditions. For example, cockpit instruments are provided with appropriate legends that are pilot observed, in daylight, by virtue of the reflecting ability of the legend when it receives external light. When the aircraft is operated during the hours of darkness, an external light source within the airplane cockpit is prohibited because it interferes with pilot vision externally of the aircraft. Accordingly, the instrument panel must be so constructed as to be capable of transmitting light from a source invisible to the pilot but nevertheless sufficient to visually and softly illuminate the mentioned legends so that they are pilot visible and without admitting of light leakage from the source which could interfere with pilot vision. Panel construction of this nature usually employs a relative thick, generally transparent or translucent plastic layer which is capable of light transmission from a panel edge source. The panel per se is additionally covered with a relatively thin light retarding, opaque sheet which admits of substantial light passage only at areas where the instrument indicia or legends are to be illuminated. Weight considerations, of course, dictate that the opaque sheet be as thin as possible consistent with its function. Accordingly, with the relatively thin opaque sheet conventionally used in this application, a secondary problem has arisen which relates directly to the mode of fastening or securing the opaque panel to the basic light transmitting panel. Conventionally, appropriate screws and nuts have been used to accomplish this connection but have resulted in tearing or damage to the relatively thin opaque sheet. Such damage results in light leakage which, as noted, is inconsistent with the purpose for which the opaque sheet is used.

To obviate this secondary difficulty, it has been suggested that appropriate washers be utilized intermediate the head of the fastener and the panel, said washers having the effect of cushioning and distributing over a wider area the compressive stress incident to fastener securing. The mere use of an intervening washer, however, has not completely solved the problem as it has been found that washer rotation during the fastener assembly operation as well as washer rotation as a result of vibrational stresses induced by aircraft operation has resulted in a galling and fracturing of the thin opaque sheet, thus admitting of light leakage as a result of installation accident or at sometime during aircraft use.

In the construction of cockpit panels, the usual structure is such that the laminated panel may be provided with a tapped or threaded bore and the opaque sheet provided with appropriate openings in congruent alignment with the tapped bore in the base panel. Fastening devices, usually of the screw type and in the smaller screw ranges, namely, sizes 4 to 8, inclusive, are employed to secure the opaque panel to the light transmitting panel. As noted above, if the fastener per se is utilized, the relatively thin opaque panel is usually damaged, admitting of light leakage. Employing a conventional washer intermediate the head of the fastening screw and the opaque panel results in similar sheet destruction in view of the fact that the standard metallic washer tends to rotate during installation and will also be rotatable as a result of vibratory action during aircraft operation. Again, the thin opaque sheet may easily be fractured resulting in undesirable light leakage as well as panel disassembly. Further, conventional washers heretofore employed have also proven to be ineffective to completely seal light leakage even though extreme care was utilized in installation to avoid opaque sheet fracture.

With the above in mind, it will be apparent that any fastening device used for the purpose herein set out logically should be of such design that it so engage the opaque panel so as not to damage the panel either during installation and not be subject to accidental rotation as a result of vibratory stresses during aircraft use. With the consideration being given to the hereinafter disclosed invention, it will be apparent that the structure here illustrated meets these functional requirements by providing an appropriate washer element for interposition between the head of a fastening element and the opaque sheet which is to be secured to the instrument panel, said washer element preferably being constructed of "nylon" material or the like which will be slightly yieldable throughout the washer body under the compressive loads geenrated by the smaller size fasteners here under consideration. The yieldable characteristic of the washer avoids rotation during installation, provides for the uniform distribution of stresses over the adjacent engaged surface of the opaque sheet, and lastly, has the characteristic of maintaining a residual compressive stress throughout its body to maintain the fastener under a slight tension which avoids loosening during vibratory stress activity. The body stress within the washer, coupled with a determined frictional engagement with the sheet material, maintains the washer in fixed position, avoiding rotation under the imposition of the mentioned vibratory stresses.

Further features of the disclosed invention relate to a novel washer structure having an appropriate cavity for recessing the head of the fastening element, thereby avoiding accidental contact therewith and accidental loosening thereof. Other disclosed and desirable features are structure which avoids the accidental galling of the washer surface upon installation of the fastener element and a unique structural arrangement to provide a composite fastener-washer assembly during storage and transport, thereby facilitating the installation operation by virtue of the fact that the fastening device is placed in the hands of the installer in a washer-assembled condition.

These and other features and advantages of the disclosed invention will become apparent in the course of the following description and from an examination of the associated drawing, wherein:

FIGURE 1 is a partially fragmentary, side elevational view of a typical washer fastener arrangement prior to assembly;

FIGURE 2 is a side elevational view of a structure similar to FIGURE 1 illustrating the washer and fastener in assembled condition prior to installation;

FIGURE 3 is a side elevational, partially sectional, fragmentary view of an alternate washer and fastener assembly and illustrating the arrangement in installed condition on an aircraft panel;

FIGURE 4 is a sectional view taken along line 4—4 of FIGURE 3;

FIGURE 5 is a sectional view similar to FIGURE 4 but illustrating an alternate construction which may be employed on the underside of the washer; and FIGURE 6 is a sectional view taken along line 6—6 of FIGURE 5.

Describing the invention in detail, attention is initially directed to FIGURES 1 and 2 which illustrate one form of the hereindisclosed invention. The initial embodiment of the invention comprises a fastening device such as a screw indicated generally at 2. The screw illustrated is of the pan head variety but the invention may reasonably be applied to any type of headed fastener. The screw fastener 2 is constructed so that a segment of the shank 4 immediately underneath the undersurface 6 of the screw head is provided with a reduced diameter. The lower or terminal segment of the screw shank is provided with appropriate threads 8, said threads having an apex diameter 10 substantially greater than the diameter of the reduced neck or shank 4.

An appropriate washer indicated generally at 12 is provided, said washer comprising a continuous annular member having a central aperture 14 formed therewith and extending therethrough. The aperture 14 is continuously threaded as at 16 to the tooth form of the thread complementing the tooth forms of the threads 8 formed on the lower end of the shank 4. Returning to the fastener 2, it will be understood that the diameter of the shank neck 4 may be equal to the root diameter of the male threads 8 or in the alternative, the apex diameter of the female threads 16 formed in the washer 12. If desired, the diameter of the shank 4 may be slightly larger than the apex diameter of the female threads 16 of the washer 12 to provide a positive interfit at assembly, the purposes of which will hereinafter be described in detail.

At this point, it will be well to recall that the particular structure herewith disclosed is desirably adapted for the mounting of the referred to, relatively thin opaque sheet material to the illuminable base material of aircraft instrument panels. Recalling that the nature of the opaque sheet material was such that it is readily subject to fracture, it will be understood that the washer 12 is desirably constructed of appropriate plastic material which has the physical characteristics of being slightly compressible through its body during the fastening operation. As noted, for this purpose, an appropriate "nylon" material has been found highly satisfactory. In addition to being slightly compressible, the nylon washer material has been found to form a desirable frictional coefficient so as to resist rotation and thereby avoid sheet fracture as described.

In view of the fact that the particular application referred to requires at installation the use of the desired and mentioned washer material, efficiency in installation and avoidance of accidental substitution is accomplished by a construction wherein the fastener and washer are associated as a captive unit. With this in mind, the function of the threaded aperture 14 of the washer 12 will become apparent. Directing attention to FIGURE 2, it will be seen that the washer 12 may be rotatably positioned on the shank of the fastener 2 initially by rotatable threaded engagement with the lower threaded shank 8 until such time as the washer passes above the threaded portion and is in horizontal alignment with the reduced upper shank portion 4. It will thus be apparent that the fastener 2 and washer 12 form an operative unit and that accidental loss and misplacement of the washer is avoided. As noted above, the shank diameter 4 may be slightly larger than the internally directed apex diameter of the female threads 16 of the washer 12. In this circumstance, the inwardly-directed points of the threads formed in the washer 12 slightly interfere with the diameter of the shank 4 and thus provide a positive lock between the fastener 2 and the washer 12 during storage and shipment. Recalling that the washer 12 is desirably made from an appropriate nylon material which is slightly compressible, it will be apparent that the slight interfering fit herein referred to and over the relatively minor area of the apex or tip of the female screw thread will not materially affect either the thread form or the fit of the washer 12 onto the fastener 2. However, it will serve to frictionally lock the washer in place and avoid accidental disassembly.

As will hereinafter appear, the minor area of engagement between the tooth form and the shank 4 is substantially less than the total surface area 18 on the underside of the washer 12. Accordingly, when the washer embodiment of FIGURES 1 and 2 is used for the installation above described, the compressive effect of the fastener through the body of the washer 12 and at the surface 18 more than overcomes any frictional effect between the shank 4 and the apexes of the screw thread 16 whereby, upon utilization of the fastener in FIGURES 1 and 2 in the mentioned installation, the frictional effect at the surface 18 prevents washer rotation, thus obviating any tendency of the washer 12 to damage the adjacent and abutting opaque sheet material. As an additional desirable feature of the embodiment shown in FIGURES 1 and 2, an appropriate thin metallic washer 20 may be interposed between the upper surface 22 of the washer 12 and the lower head surface 6 of the fastener 2. Thus, during rotation of the head of the fastener 2, the assembly will not induce galling of the upper surface of the washer 12 and, further, any tendency of the washer 12 to rotate during such installation will be substantially reduced.

Attention is now directed to FIGURE 3 which illustrates a modification of the herein disclosed invention. Initially, it will be understood that the disclosure of FIGURE 3 contemplates a complete assembly of the fastener in situs on an appropriate aircraft panel. With this in mind, it will be understood that the numeral 24 indicates a translucent panel while the numeral 26 indicates a relatively thin opaque sheet material which is mounted in faying relationship on the panel. The fastener utilized in this embodiment is similar to the embodiment earlier described and, accordingly, is indicated by the numeral 2a and again comprises a lower threaded shank portion 8a and an upper reduced diameter shank portion 4a. A washer of appropriate material such as the nylon described above, is employed and indicated by the numeral 30. The washer is provided with a female thread section 32 formed at the central aperture 34 of the washer. The upper part of the washer is provided with a cavity 36, the latter being peripherally surrounded by a wall 38, said wall 38 having a vertical dimension as compared with the depth of the cavity 36 equal to or slightly greater than the head of the screw 2a. It will thus be apparent that in the assembled condition, the screw 2a and particularly the head thereof is received entirely within the cavity 36 and, thus, accidental loosening of the screw is avoided by virtue of the guard provided by the peripheral wall 38.

Attention is directed to the undersurface 40 of the washer 30. The undersurface 40 is provided with a plurality of downwardly directed bosses 42, 42. In the preferred form of this embodiment, the bosses are evenly distributed throughout the entire area of the undersurface 40 and evenly distributed around the central aperture 34 of the washer 30. As is best seen in FIGURE 3, the bosses 42, at installation, abut the facing surface of the opaque sheet 26. It will be apparent from this construction that as the fastener 2a is secured, compressive stresses are again distributed through the washer 30 resulting in a slight compression of the bosses 42 as they are urged into pressured engagement with the surface of the sheet 26. Because the distributed bosses 42 substantially reduce the entire cross-sectional area of the washer 30, the bosses 42 tend to provide points of stress concentration and, therefore, are unit loaded to a higher degree than if the washer 30 was in full-face engagement with the sheet 26. In this manner, each of the bosses tends to compress slightly, thus providing a constant tensional load on the fastener 2a and a frictional load on the washer 30 resisting any rotation thereof both at installation and during vibratory stress condition during aircraft service. In this manner, accidental damage to the sheet 26 is avoided.

Directing attention to FIGURES 5 and 6 which illustrate an alternate construction of an undersurface of a typical washer and thus the surface illustrated would normally be in faying engagement with the upper surface of the sheet 26 and is here designated by the numeral 40a. The surface 40a is uniformly V-grooved as at 50, 50, the grooves 50 being typically illustrated in the fragmentary view of FIGURE 6 and it will be understood that the grooves 50 are preferably formed within the surface 40a in a uniform geometric pattern across said surface. In this manner, a plurality of uniformly distributed bosses 52, 52 each having flat surfaces 54 are evenly dispersed throughout the entire surface 40a. The bosses 52, when in assembled relationship with an appropriate fastener and in abutting relationship with an opaque sheet and as heretofore illustrated in FIGURE 3, again provide areas of higher stress concentration as a result of the compressive loading of the washer by the fastener and slightly compress to again maintain the fastener under a uniform tensional load and also frictionally engage the surface of the opaque sheet so as to prevent installation rotation of the washer as well as rotation under vibratory stresses incident to aircraft operation.

As a result of the described structure, a combined fastener washer assembly has been provided particularly adaptable to the function of securing the relatively thin opaque sheet of plastic material to the illuminating member of an aircraft instrument panel. The structure as described not only serves as a mounting of the assembly means for the component parts of the instrument panel, but also are particularly adapted to avoid both installation and use difficulties heretofore incident with fastener arrangements in this application. Specifically, the structure described avoids accidental fracture of the thin opaque material which is surface mounted on the panel and thereby avoids the occurrence of accidental light leakage with its attendant safety hazards.

The invention as shown is by way of illustration and not limitation and may be subject to various modifications without departing from the scope of the appended claims.

What is claimed is:

1. In a fastener assembly for use in securing an easily frangible sheet of plastic material to a basic mounting surface, the combination of:
    a screw having a shank,
    said shank comprising a lower threaded portion and an upper uniform diameter portion of lesser outside diameter than the lower portion,
    a head adjacent the upper end of said shank,
    said head having an under surface defining the upper limit of said uniform diameter portion,
    a washer comprising an annular member of plastic material having a central aperture therein of smaller inside diameter than the outside diameter of said lower threaded portion of the shank,
    said annular member having a concentric cavity formed in the upper side thereof and defined by an annular wall peripherally therearound,
    said cavity having a diameter larger than the diameter of the aperture,
    said cavity being dimensioned to receive said head of said fastener,
    said aperture having a female thread formed on the inner surface thereof and complementing the thread formed on said lower portion of the shank,
    said washer being formed of nonmetallic plastic material generally resiliently compressive throughout its body,
    said washer being mounted on said upper uniform portion of the shank and being captive between said head and said lower threaded portion of the shank with said head positioned in said cavity,
    said washer having a plurality of bosses formed on its lower side and projecting from the surface thereof.

2. A fastener assembly according to claim 1,
    wherein said bosses are uniformly distributed on the under surface of said washer and surrounding said aperture,
    said washer having a thickness equivalent to at least three turns of the thread of the screw and the female thread in the aperture of the washer having at least three turns.

3. A fastener assembly according to claim 2,
    and including a thin metallic washer interposed between the under surface of said head and said washer member and disposed in said cavity.

4. A fastener assembly according to claim 3,
    wherein said bosses are semi-spherical.

5. A fastener assembly according to claim 3,
    wherein said bosses are of uniform geometric pattern as seen in plan view.

6. A fastener assembly according to claim 5,
    wherein said bosses are formed by a plurality of intersecting V-shaped grooves formed in the lower surface of said washer.

7. A combination as set forth in claim 1 in which the diameter of said upper uniform diameter portion of the shank is substantially equal to the root diameter of said lower threaded portion of the shank.

8. In a fastener assembly,
    a sheet of base material,
    a second sheet of relatively thin, easily frangible material in faying relationship with the base material,
    aligned apertures in the respective sheets of materials, the aperture in said base material having an internal threaded section thereon,
    a fastener assembly for securing said second sheet of material to said first sheet of material,
    said fastener assembly comprising a screw having a shank thereon,
    a head having an under surface transverse to the axis of the screw and defining the upper terminus of said shank,
    said shank having a lower threaded portion and an upper, generally uniform diameter portion of smaller outside diameter than the lower portion,
    a washer operatively interposed between the under surface of said head and the upper surface of said second material,
    said washer having a central opening therein accommodating the telescopic reception of said shank and having a concentric cavity formed in the upper side thereof,
    said washer having a thickness of at least three turns of the thread of the screw,
    said opening having a screw thread of at least three turns for the rotatable admission of said lower threaded portion of the shank whereby said washer is mounted in generally captive relationship with said shank and adjacent said upper uniform diameter portion,
    said washer embracing said upper portion of the shank and being captive between said head and the lower threaded portion of the shank with said head positioned in said cavity, said washer being composed of nonmetallic plastic material having the characteristic of being generally resiliently compressive throughout its body whereby said washer tends to maintain said screw under a tensional load in assembly and said washer physically pressure-engages the upper surface of said second sheet material to frictionally resist rotation relative thereto, said washer having a plurality of uniformly distributed bosses formed on the lower surface thereof for physical abutting engagement with the upper surface of said second sheet material.

References Cited by the Examiner

UNITED STATES PATENTS

| | | | |
|---|---|---|---|
| 2,439,516 | 4/48 | Holcomb. | |
| 2,552,004 | 5/51 | Erdman | 85—50 |
| 2,672,069 | 3/54 | Mitchell | 85—50 |
| 2,756,795 | 7/56 | Clingman. | |
| 2,761,347 | 9/56 | McKee | 85—50 |
| 2,771,259 | 11/56 | Laystrom. | |
| 3,001,567 | 9/61 | Brill | 151—7 |
| 3,062,557 | 11/62 | Underwood | 85—1 |

FOREIGN PATENTS

| | | |
|---|---|---|
| 534,439 | 3/41 | Great Britain. |
| 640,487 | 7/50 | Great Britain. |

EDWARD C. ALLEN, *Primary Examiner.*

CARL W. TOMLIN, *Examiner.*